US012450731B2

(12) United States Patent
Rajapakse et al.

(10) Patent No.: US 12,450,731 B2
(45) Date of Patent: Oct. 21, 2025

(54) AUTOMATED SPINE HEALTH ASSESSMENT USING NEURAL NETWORKS

(71) Applicant: The Trustees of the University of Pennsylvania, Philadelphia, PA (US)

(72) Inventors: Chamith Sudesh Rajapakse, Cherry Hill, NJ (US); Abhinav Suri, San Antonio, TX (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 901 days.

(21) Appl. No.: 17/583,954

(22) Filed: Jan. 25, 2022

(65) Prior Publication Data
US 2022/0237779 A1 Jul. 28, 2022

Related U.S. Application Data

(60) Provisional application No. 63/141,280, filed on Jan. 25, 2021.

(51) Int. Cl.
*G06T 7/00* (2017.01)
*A61B 6/00* (2006.01)
(Continued)

(52) U.S. Cl.
CPC ............ *G06T 7/0012* (2013.01); *A61B 6/505* (2013.01); *A61B 6/5217* (2013.01); *G06T 7/11* (2017.01);
(Continued)

(58) Field of Classification Search
CPC ............... G06T 7/0012; G06T 7/11; G06T 2207/20084; G06T 2207/30012; G06T 2207/10081; G06T 2207/10088; G06T 2207/10104; G06T 2207/10116; G06T 2207/20081; A61B 6/505; A61B 6/5217; G16H 30/40; G16H 50/30
See application file for complete search history.

(56) References Cited

U.S. PATENT DOCUMENTS 8,891,848 B2  11/2014  Blumfield et al.
8,965,083 B2   2/2015  Ben Ayed et al.
(Continued)

OTHER PUBLICATIONS

Sekuboyina et al., "VerSe: A Vertebrae labelling and segmentation benchmark for multi-detector CT images," Medical Image Analysis, vol. 73, pp. 1-32 (2021).
(Continued)

*Primary Examiner* — Kent Yip
(74) *Attorney, Agent, or Firm* — Jenkins, Taylor & Hunt, P.A.

(57) ABSTRACT

In some examples, a method includes receiving a medical image of at least a portion of a spine in a patient. The method includes supplying the medical image to a neural network trained using training spine images and, for each training spine image, one or more spine measurement annotations. The method includes detecting, using the neural network, five or more vertebral landmarks for each of a plurality of vertebral bodies depicted in the medical image. The method includes outputting, for at least a first vertebral body, one or more deformity measurements based on the vertebral landmarks for the first vertebral body.

16 Claims, 8 Drawing Sheets

(51) Int. Cl.
    A61B 6/50    (2024.01)
    G06T 7/11    (2017.01)
    G16H 30/40   (2018.01)
    G16H 50/30   (2018.01)

(52) U.S. Cl.
    CPC ............. G16H 30/40 (2018.01); G16H 50/30 (2018.01); *G06T 2207/20084* (2013.01); *G06T 2207/30012* (2013.01)

(56) References Cited

U.S. PATENT DOCUMENTS

| | | | |
|---|---|---|---|
| 10,366,491 | B2 | 7/2019 | Yang et al. |
| 2007/0242869 | A1 | 10/2007 | Luo et al. |
| 2008/0044074 | A1 | 2/2008 | Jerebko et al. |
| 2019/0370957 | A1* | 12/2019 | Manickam ........... G06V 10/454 |
| 2021/0097678 | A1* | 4/2021 | Dutta ....................... G06T 7/11 |

OTHER PUBLICATIONS

Weaver et al., "Prevalanece and Cost of Subsequent Fractures Among U.S. Patients with an Incident Fracture," J Manag Care Spec Pharm, vol. 23, No. 4, pp. 1-13 (2017).

Rajapakse et al., "Vertebral deformities and fractures are associated with MRI and pQCT measures obtained at the distal tibia and radius of postmenopausal women," Osteoporosis Int, vol. 25, pp. 973-982 (2014).

Wong et al., "Vertebral compression fractures: a review of current management and multimodal therapy," Journal of Multidisciplinary Healthcare, vol. 6, pp. 205-214 (2013).

Cunha-Henriques et al., "Postmenopausal Women with Osteoporosis and Musculoskeletal Status: A Comparative Cross-Sectional Study," J Clin Med Res, vol. 3, No. 4, pp. 168-176 (2011).

Bartalena et al., "Prevalence of thoracolumbar vertebral fractures on multidetector CT Underreporting by radiologists," European Journal of Radiology, vol. 69, pp. 555-559 (2009).

Salaffi et al., "The Burden of Prevalent Fractures on Health-Related Quality of Life in Postmenopausal Women with Osteoporosis: The IMOF Study," The Journal of Rheumatology, pp. 1-10 (2007).

"Bone Health and Osteoporosis: A Report of the Surgeon General," Department of Health and Human Services, pp. 1-437 (2004).

Lenchik et al., "Diagnosis of Osteoporotic Vertebral Fractures: Importance of Recognition and Description by Radiologists," AJR, vol. 183, pp. 1-10 (Oct. 2004).

Silverman et al., "The Relationship of Health-Related Quality of Life to Prevalent and Incident Vertebral Fractures in Postmenopausal Women with Osteoporosis," Arthritis & Rheumatism, vol. 44, No. 11, pp. 2611-2619 (Nov. 2001).

Genant et al., "Vertebral Fractures Assessment Using a Semiquantitative Technique," Journal of Bone and Mineral Research, vol. 8, No. 9, pp. 1137-1148 (1993).

Chae et al., "Decentralized convolutional neural network for evaluating spinal deformity with spinopelvic parameters," Computer Methods and Programs in Biomedicine, vol. 197, pp. 1-12 (2020).

Kim et al., "Web-Based Spine Segmentation Using Deep Learning in Computed Tomography Images," Healthc Inform Res., vol. 26, No. 1, pp. 1-7 (2020).

Cho et al., "Automated Measurement of Lumbar Lordosis on Radiographs Using Machine Learning and Computer Vision," Global Spine Journal, vol. 10, No. 5, pp. 1-8 (2020).

Huang et al., "Spine Explorer: a deep learning based fully automated program for efficient and reliable quantifications of the vertebrae and discs on sagittal lumbar spine MR images," The Spine Journal, vol. 20, pp. 1-10 (2020).

Masad et al., "Automated measurements of lumbar lordosis in T2-MR images using decision tree classifier and morphological image processing," Engineering Science and Technology, an International Journal, vol. 22, pp. 1-8 (2019).

Vania et al., "Automatic spine segmentation from CT images using Convolutional Neural Network via redundant generation of class labels," Journal of Computational Design and Engineering, vol. 6, pp. 1-9 (2019).

Paszke et al., "PyTorch: An Imperative Style, High-Performance Deep Learning Library," 33rd Conference on Neural Information Processing Systems (NeurIPS 2019), pp. 1-12 (2019).

Han et al., "Spine-GAN: Semantic segmentation of multiple spinal structures," Medical Image Analysis, vol. 50, pp. 1-13 (2018).

Lu et al., "Deep Spine: Automated Lumbar Vertebral Segmentation, Disc-Level Designation, and Spinal Stenosis Grading Using Deep Learning," Proceedings of Machine Learning Research, vol. 85, pp. 1-16 (2018).

Ebrahimi et al., "Vertebral corners detection on sagittal X-rays based on shape modeling, random forest classifiers and dedicated visual features," Computer Methods in Biomechanics and Biomedical Engineering: Imaging & Visualization, vol. 7, No. 2, pp. 1-26 (2018).

Chen et al., "Automatic Localization and Identification of Vertebrae in Spine CT via a Joint Learning Model with Deep Neural Networks," MICCAI 2015, Part I, LNCS 9349, pp. 1-8 (2015).

Schindelin et al., "Fiji: an open-source platform for biological-image analysis," Nature Methods, vol. 9, No. 7, pp. 1-7 (Jul. 2012).

Van der Walt et al., "The NumPy Array: A Structure for Efficient Numerical Computation," Computing in Science & Engineering, pp. 1-9 (Mar./Apr. 2011).

Pedregosa et al., "Scikit-learn: Machine Learning in Python," Journal of Medicine Learning Research, vol. 12, pp. 1-6 (2011).

Lin, "Identification of Spinal Deformity Classification with Total Curvature Analysis and Artificial Neural Network," IEEE Transactions on Biomedical Engineering, vol. 55, No. 1, pp. 376-382 (Jan. 2008).

Yushkevich et al., "User-guided 3D active contour segmentation of anatomical structures: Significantly improved efficiency and reliability," NeuroImage, vol. 31, pp. 1-13 (2006).

\* cited by examiner

AUTOMATED SPINE HEALTH ASSESSMENT USING NEURAL NETWORKS

PRIORITY CLAIM

This application claims the benefit of U.S. Provisional Patent Application Ser. No. 63/141,280, filed Jan. 25, 2021, the disclosure of which is incorporated herein by reference in its entirety.

TECHNICAL FIELD

This specification relates generally to automated computer analysis of medical images for spine health assessment using neural networks.

BACKGROUND

Vertebral fractures are the most common fracture types among those suffering from osteoporosis and lead to increased mortality; however, these fractures are highly underreported. Finding a way to automatically detect & diagnose these fractures and other spine health metrics is critical to reducing underreporting.

Accordingly, there exists a need for methods, systems, and computer readable media configured for automated spine health assessment.

SUMMARY

This specification describes methods, systems, and computer readable media for automated spine health assessment. A deep learning system is configured to automatically determine deformity diagnoses, output other clinically useful metrics (lumbar lordosis angle), and produce vertebral body segmentations (for bone health/density calculations) across multiple modalities (MR, CT, X-ray) in a rapid manner. A neural network is configured to output vertebral body landmarks (e.g., for vertebral height measurement) and segmentation masks. The network can, in some cases, rapidly diagnose vertebral fractures and severity, output other clinically useful metrics (lumbar lordosis angle), and produce segmentation masks for bone quality and spine health metrics across multiple modalities.

In some examples, a method includes receiving a medical image of at least a portion of a spine in a patient. The method includes supplying the medical image to a neural network trained using training spine images and, for each training spine image, one or more spine measurement annotations. The method includes detecting, using the neural network, five or more vertebral landmarks for each of a plurality of vertebral bodies depicted in the medical image. The method includes outputting, for at least a first vertebral body, one or more deformity measurements based on the vertebral landmarks for the first vertebral body.

The subject matter described herein may be implemented in hardware, software, firmware, or any combination thereof. As such, the terms "function" or "node" as used herein refer to hardware, which may also include software and/or firmware components, for implementing the feature(s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF DRAWINGS

FIG. 4. Landmark detection and deformity diagnosis. In the first column, we report relative errors for ranges of vertebral bodies, ranging from L5-C3 (C1/C2 not included since impossible to detect Hm). Error % s in the X and Y direction are reported as a % of the vertebral body width and height respectively. Box and whisker plots show median, 25th-75th percentile range and 1.5×IQR. In the second column, we report deformity class diagnosis accuracies as a confusion matrix (read by column, off-diagonal diagnoses are misclassifications). In the third column, we report deformity class and grade accuracies for each imaging modality. In the fourth column, we show example outputs from the neural network. Light dots are ground-truth annotated vertebral body landmarks, and darker dots are landmarks predicted by the network. Words by vertebral bodies correspond to deformity classifications (if deformity is detected, it is boxed w/outline) with grade rating noted. Outlined insert in MR image shows what heights Ha, Hm, and Hp correspond to.

DETAILED DESCRIPTION

This specification describes methods, systems, and computer readable media for automated spine health assessment.

Figure 1A:
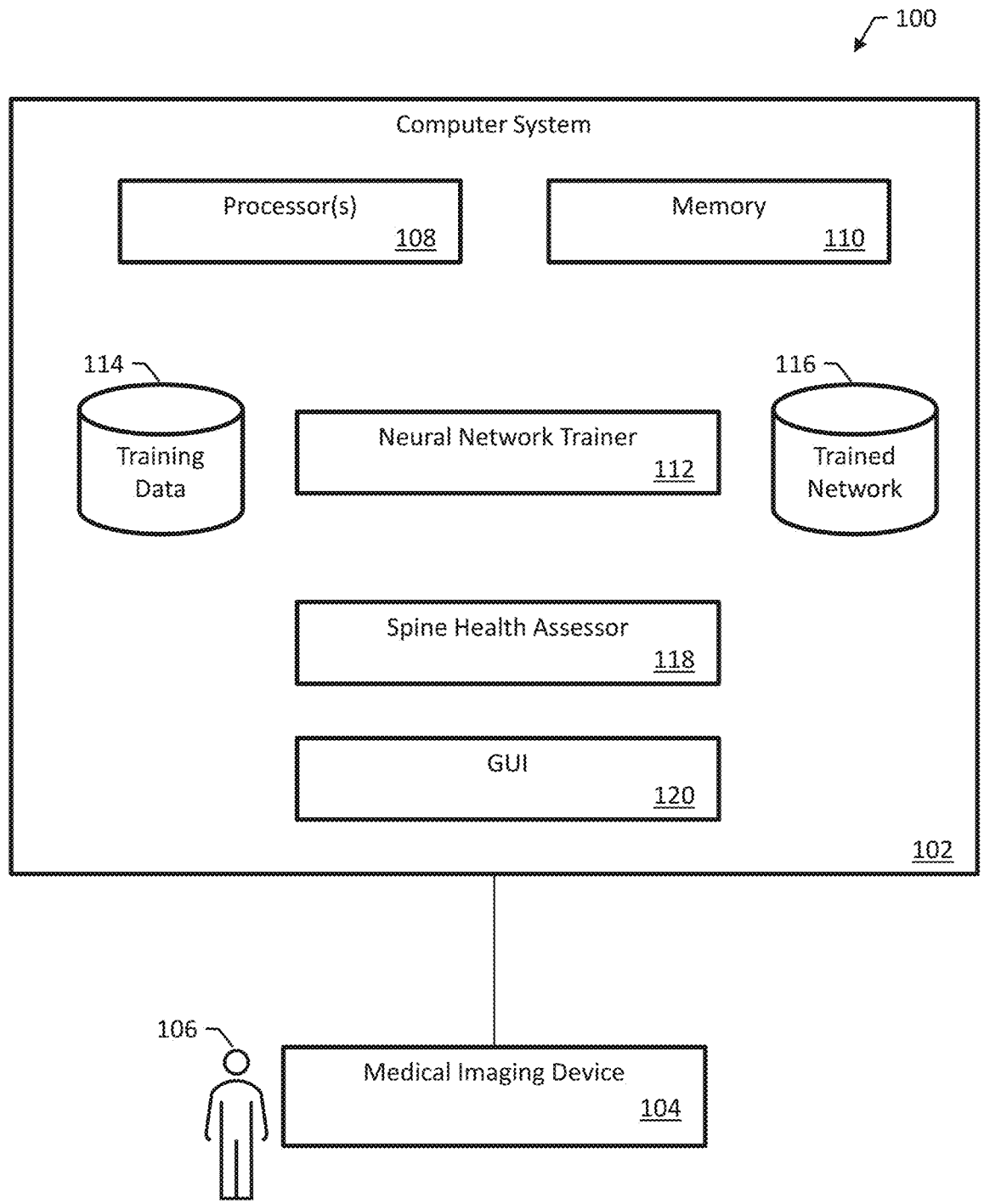
FIG. 1A is a block diagram of an example system for non-invasively predicting patient-specific bone resilience or toughness.

FIG. 1A is a block diagram of an example system 100 for non-invasively predicting patient-specific bone resilience or toughness.

The system 100 includes a computer system 102 and a medical imaging device 104 configured for acquiring images of a patient 106. The medical imaging device 104 can be, e.g., a magnetic resonance imagining (MRI) device, a computed tomography (CT) scanner, or an X-ray imaging device. The medical imaging device 104 acquires images of the patient 106, e.g., a medical image of at least a portion of a spine in a patient, and provides the images to the computer system 102, e.g., over a data communications network.

The computer system includes one or more processors 108 and memory 110 storing executable instructions for the processors 110. The computer system includes a neural network trainer 112. The neural network trainer 112 is configured, by virtue of appropriate programming, for receiving training data 114 that includes training spine images and, for each training spine image, one or more spine measurement annotations. The neural network trainer 112 is configured for using the training data 114 to train a neural network 116 for predicting bone resilience or toughness.

The spine health assessor 118 is configured, by virtue of appropriate programming, for receiving a medical image of at least a portion of a spine in a patient and supplying the medical image to the neural network 116. The spine health assessor 118 is configured for detecting, using the neural network 116, five or more vertebral landmarks for each of a number of vertebral bodies depicted in the medical image.

The spine health assessor 118 is configured for outputting, for at least a first vertebral body, one or more deformity measurements based on the vertebral landmarks for the first vertebral body, e.g., by displaying the measurements or transmitting the measurements over a data communications network for display on a user device. For example, the computer system 102 can include a GUI 120 configured for displaying various results, e.g., deformity measurements and patient specific bone resilience and/or toughness.

In some examples, the computer system 102 can be configured to train a neural network to locate six vertebral landmarks, which are used to measure vertebral body heights, and to output spine angle measurements (lumbar lordosis angle) across multiple modalities.

The process of measuring vertebral deformities can be done using two methods: the Genant semiquantitative method (SQ) or quantitative morphometry (QM) method. The Genant SQ method is used visually to assess vertebral fracture grades (normal, mild, moderate, or severe) and types (wedge, biconcave, or crush). For QM, a reader must place six landmarks around the vertebral body (corresponding to the anterior, middle, and posterior of the vertebral body). From vertebral heights are calculated for use in fracture identification algorithms.

SQ and QM methods have been compared in the assessment of fractures, and, while QM can detect fractures, a confirmatory SQ read is needed to reduce false positives. Additionally, QM has not been widely used in clinical practice because it is time consuming to mark vertebral keypoints. However, relying on the SQ method alone is not ideal as scans must be brought to the attention of a radiologist to review, potentially leading to misses among cases that do not display clinical symptoms of fracture. This issue potentially contributes to the high rate of underreporting of vertebral fractures among radiologists (as high as 66% to 85%). A method that automates the QM process can be used to opportunistically prioritize scans for SQ grading by a radiologist, potentially reducing the under-reporting of vertebral deformities.

The computer system 102 to train a neural network for performing vertebral height measurements in sagittal spine MRI and CT imaging studies, as well as lateral radiograph images with an evaluation time of less than 2 seconds per imaging section when run on publicly available computing power. The resulting outputs from the network can yield other clinically useful measurements such as, but not limited to, L1-L5 lumbar lordosis. This network offers the ability to opportunistically screen for vertebral deformities, reducing the under-reporting of vertebral deformities.

In some examples, the neural network is trained on medical images, e.g., MRT, CT, and radiography images. The images are manually annotated with six landmarks for each visible vertebral body. The system then receives, as in input, an imaging study. Then it detects and outputs six landmarks for each vertebral body. Finally, it outputs anterior, middle, and posterior vertebral heights for vertebral deformity quantification.

Examples of non-invasively predicting patient-specific bone resilience or toughness are described further below with respect to a study performed on the methodology.

INTRODUCTION

Osteoporosis is the most common cause of fractures, affecting 10 million individuals over the age of 50[1]. Vertebral fractures are the most common outcome of osteoporosis, comprising of almost 50% of all osteoporotic fractures in the United States[2,3]. Additionally, these fractures reduce mobility in patients, increase depression, and increase mortality among patients[4]. However, diagnosis of these fractures remains a large problem as only one-third of these fractures, which increase with the accumulation of vertebral deformities, are clinically diagnosed[5]. Thus, by detecting vertebral deformities from routine imaging studies, future fractures can potentially be avoided with proper intervention.

However, the process of detecting these vertebral deformities is subjective and time-consuming. Each vertebra can be classified as having a fracture/deformity (of type wedge, biconcave, or crush) or not (normal) depending on the anterior (Ha), middle (Hm), and posterior (Hp) heights of each vertebral body and the degree of compression relative to each other[6,7]. Furthermore, each type of deformity can be classified as mild, moderate, or severe based on the degree of deformity (per the Genant semiquantitative method), with mild and moderate deformities being especially difficult to distinguish even by the trained eye[8]. Currently, in order to accurately diagnose individual vertebral bodies as containing fractures/deformities, it is necessary to measure Ha, Hm, and Hp for each vertebral body seen in a sagittal spine imaging study. The time-consuming nature of manual annotation and measurement contributes to underreporting (reaching as high as 85%) of vertebral deformities by specialists[9].

Figure 1B:
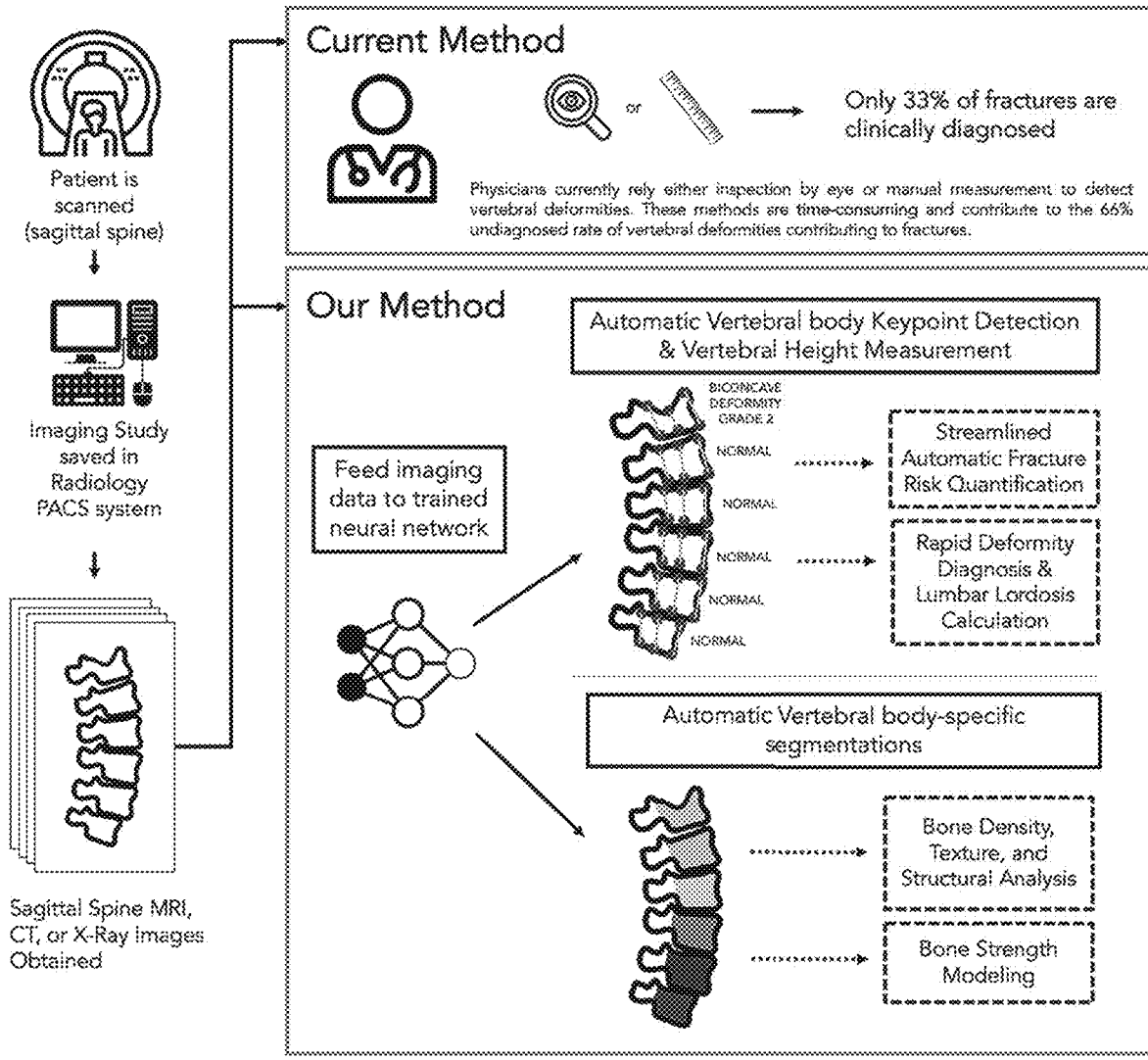
FIGS. 1B and 1C: Basic overview of our proposed network in this study. Currently, physicians detect deformities by relying on manually measuring vertebral bodies or inspecting imaging studies by eye (without measurement aid). Overall, these methods have led to only 33% of vertebral deformities being clinically diagnosed and a number of deformities being under-reported. Our method instead shows that a neural network can segment the vertebral bodies themselves for future bone texture analysis studies and detect six landmarks on each vertebral bodies as well as heights that lead to deformity diagnoses (e.g., text by top vertebral body).
Figure 1C:
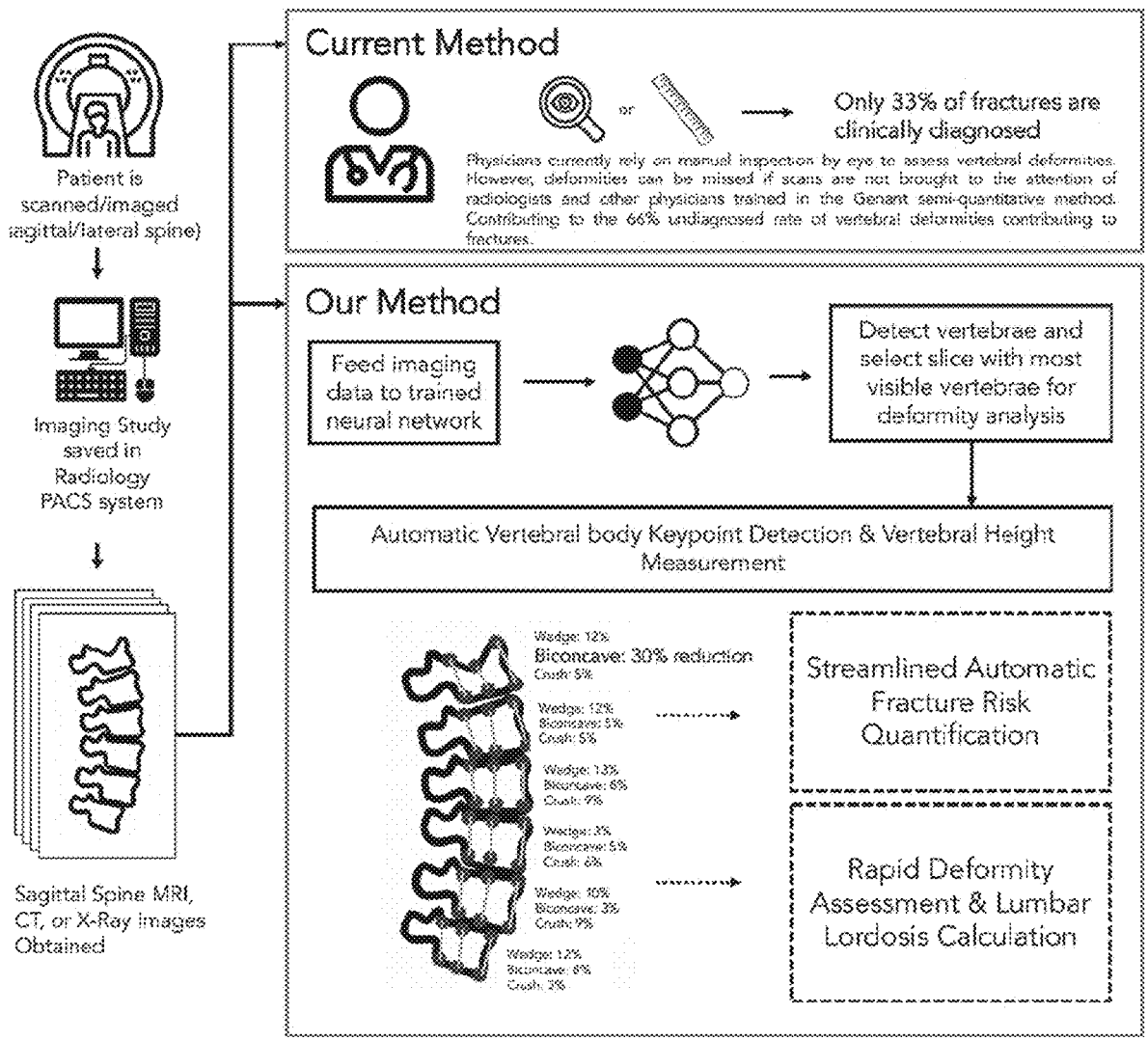

Artificial Intelligence (AI) offers potential solutions for automating the localization of objects in images and isolating features from detected objects. Here we describe the development and efficacy of a AI-based deep learning system, a neural network called SpineToolKit (SpineTK), for detecting & diagnosing vertebral body deformities in sagittal spine MR, CT, and X-ray scans with an evaluation time of <2 seconds per imaging slice. Additionally, we show that the resulting outputs from the network can yield other clinically useful measurements such as (but not limited to) L1-L5 lumbar lordosis with high fidelity. Lastly, we show that the network can output accurate vertebral body segmentations (pixel-wise delineations of vertebral bodies) that are useful for clinicians & researchers to assess spine health (via measurement of vertebral body texture/density changes over time), evaluate changes in bone structure post-procedure, and perform analyses to determine bone mechanics. An overview of the capabilities and potential applications of the neural network in comparison to current methods is shown in FIG. 1B and FIG. 1C.

Materials and Methods

Figure 2:
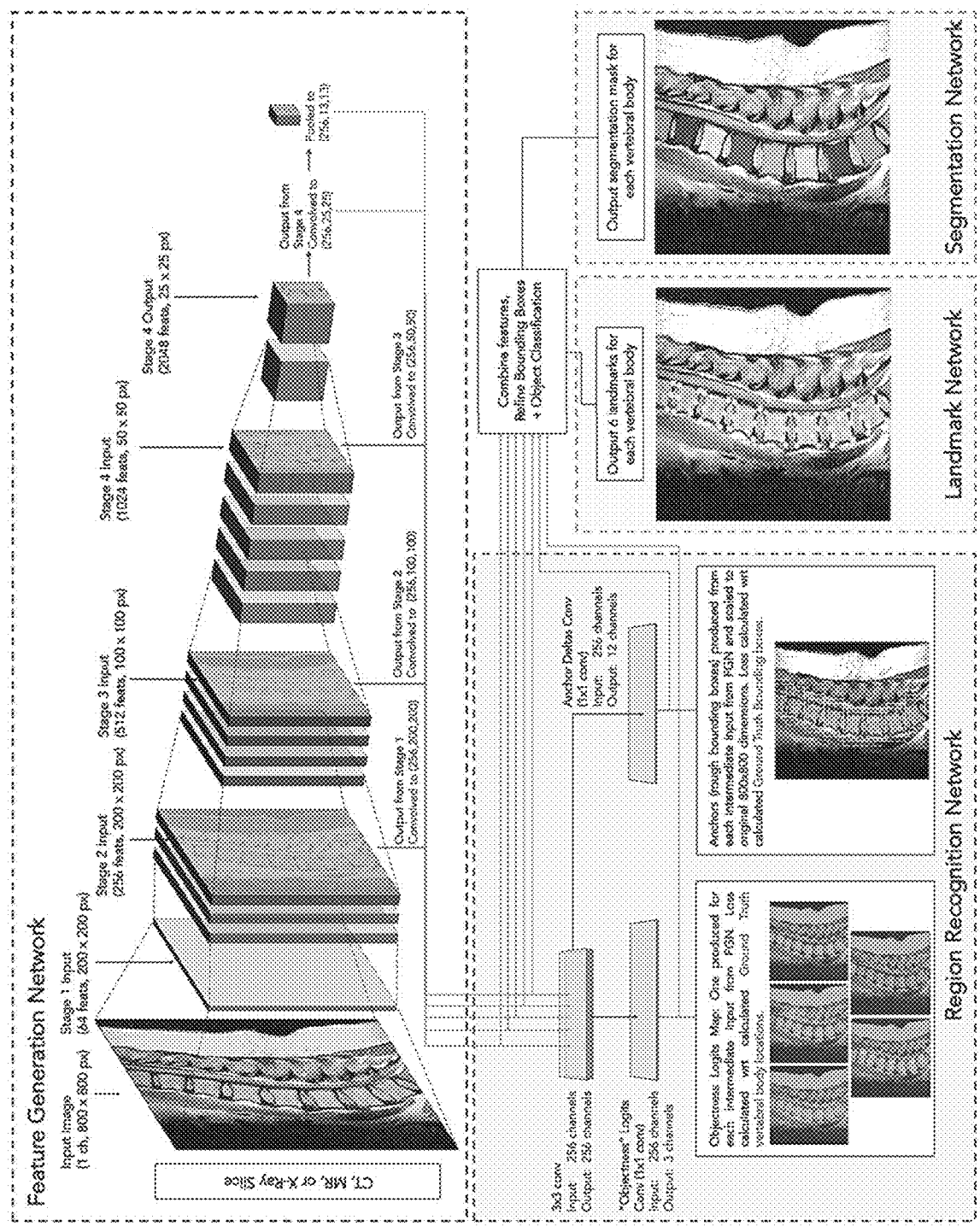
FIG. 2. Basic outline of neural network. The network is composed of three parts: a Feature Generation Network (FGN), a Region Recognition Network (RRN), and a Landmark or Segmentation Network. The FGN performs several convolutions and downsampling steps (in stages 1-4) to create features that can be learned on (dimensions of images after transformations are applied reported as [features(#), height(px)×width(px)] in the figure). Intermediate outputs from the FGN are each used to train the RRN which produces an "Objectness" logits map (showing probability of an approximate region containing an object) and anchor deltas (which are preliminary bounding boxes for desired objects). Then the objectness map and the preliminary bounding boxes are combined (along with intermediate features from the FGN), bounding boxes are refined, and final boxes are classified as "vertebral body" or background. Next, the network either marks landmarks for each detected object via a Landmark Region-based Convolutional Neural Network or a produces a segmentation. Six networks are trained in this paper—a segmentation and a landmark network for each modality (MR, CT, X-ray). Network architecture adapted from Mask R-CNN (RCNN=Region based Convolutional Neural Networks), layer names changed for clarity.

System Overview:

The final deep learning system (neural network) design accomplishes our goals by producing two outputs: the locations of six landmarks on each vertebral body (necessary for measuring vertebral body heights), and a segmentation mask (necessary for delineating location of vertebral body for density/texture/bone-strength modeling analysis). FIG. 2 shows an overview of the SpineTK network design (ref FIG. 2 caption for component explanation). We create six versions of the SpineTK network (2 tasks: landmark detection or segmentation delineation×3 modalities MR, CT, X-ray). The network receives, as input, a single slice (with most visible vertebra). It outputs either six landmarks or segmentation masks for each vertebral body visible. Through a process known as "training", the neural network learns appropriate values to perform its task accurately via being shown a subset of data (aka training data; imaging studies that were manually annotated with landmarks and segmentation masks by trained experts). Once trained, the network performance is evaluated using testing data (i.e. annotated images it that have not been input into it beforehand).

Dataset Acquisition & Training Data Annotation:

Training and testing data came from multiple centers, spanning a large patient population of a variety of vertebral fracture statuses. MR images were obtained from female patients who underwent imaging (sagittal spine) at the Hospital of University of Pennsylvania Radiology Center between Jan. 1, 2005 and Jan. 20, 2014. X-ray imaging data (sagittal spine-lumbar/thoracic region) was also obtained from the Hospital of University of Pennsylvania radiology archives from Sep. 10, 2019 to Jun. 15, 2020. One part of the CT dataset (100 cases; full spine) were obtained from an institutional collaborator. An additional 60 cases were obtained from a publicly available spine image segmentation challenge (VerSe 2019[10]; used public phase 1+2 data). Images were excluded from annotation for the following reasons: a) Image file was corrupt (12/1153 MR, 10/160 CT, 3/492 X-ray) or b) Image was of such low resolution that annotators could not complete landmark or segmentation task to best ability (18/1153 MR, 13/160 CT, 5/492 X-ray).

For each image, two types of annotations were created: a landmark annotation and a segmentation annotation. Each case is manually annotated by one of twenty-four trained experts and is reviewed for accuracy by another trained expert. First, an annotator selects an imaging slice with the most visible vertebra. Landmark annotations are made by the annotator marking six vertebral body landmarks on each vertebral body visible. Segmentation annotations are created by the annotator marking an individual mask for each vertebral body. Training data was augmented with five random transformations to train the network to work in a variety of different imaging conditions and compensate for a relatively small number of source imaging studies. Network training itself was accomplished in using publicly available compute power and a previously trained feature extraction network to shorten overall training time from days to minutes.

Neural Network Training & Testing:

Cases are assigned to the training or testing set using a standard programmatic randomization function. 80% of the appropriate dataset is allocated to training data, 20% is allocated to testing data (ref. Table 1 for specific breakdown of training and testing data). Testing data is not used to train the network and is not seen by the network prior to evaluation. All scans were converted to a common PNG format to facilitate loading into memory and pixel values were scaled to the range of 0-255 for standardization. Network training was carried out on Google Colab. On average, once imaging data was loaded into memory, networks<30 minutes to train.

Evaluation:

Evaluation of the performance of the network was carried out using multiple metrics.

Network Evaluation Time:

The ability of the network to process input data quickly is important for ultimate applicability. We evaluate how long it takes for a network to output landmarks or segmentation masks for each modality by running the network on all testing data imaging studies and measuring processing time for each input imaging slice.

Vertebral Body Detection Accuracy:

Since further analysis is predicated on the ability of the network to detect vertebral bodies, it is necessary to formally evaluate how well the network can detect vertebral bodies and how well the predicted bounding boxes for these vertebrae match with ground truth bounding-boxes. Each of the networks, after training, is evaluated for its ability to detect vertebral bodies by evaluating Intersection over Union (IoU; ref FIG. 3a) for each of the predicted bounding boxes for vertebrae compared to ground truth boxes. A precision-recall curve is created for each of the trained networks (one for each task and for each modality) based on conventions of True Positive (TP), False Positive (FP), and False Negative (FN) established in FIG. 3a (Precision=TP/[TP+FP], Recall=TP/[TP+FN]). We also evaluate the performance of the network to give a vertebral body detection accuracy rate for each region of the spine in each modality.

Figure 4:
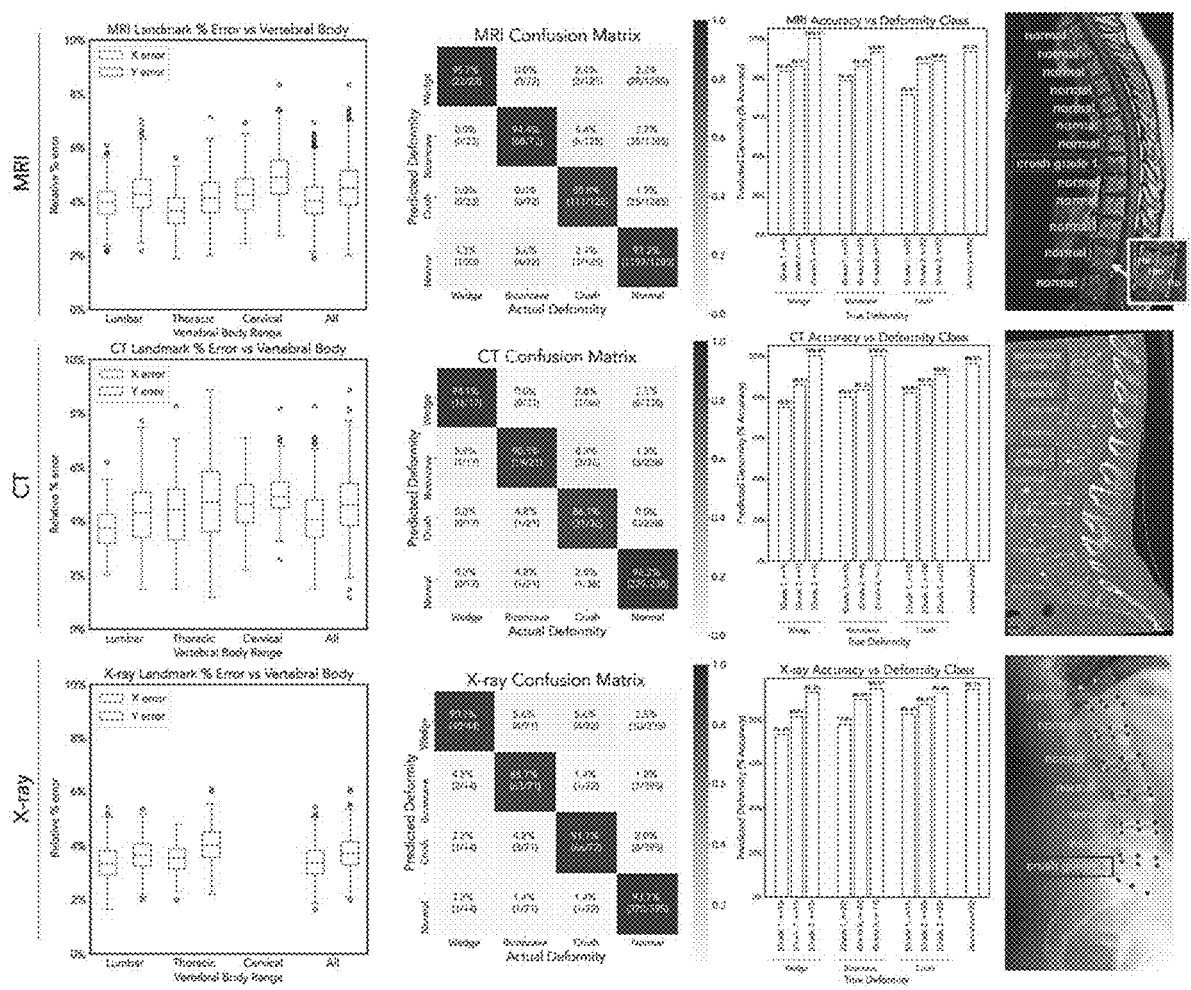

Landmark and Deformity Detection Accuracy:

To evaluate the accuracy of the landmark location predictions from the neural network across all regions of the spine, we input MR, CT, and X-ray slices to the network and evaluate how close predicted landmarks are to their manually annotated ground-truth locations (which have not been previously used to train the neural network). For each of the landmark locations, a relative percent error is determined in the X and Y direction relative to the width and height of the vertebral body to account for different vertebral body sizes (ref FIG. 4).

From these landmark locations, we then determine the type of deformity and grade of deformity based on the following formulae (ref FIG. 4, top right panel MR image, inset for visualization of what Ha/Hm/Hp refer to):

$$\text{Wedge Deformity} = 100\% * \left(1 - \frac{H_p}{H_a}\right)$$

$$\text{Biconcave Deformity} = 100\% * \left(1 - \frac{H_p}{H_m}\right)$$

$$\text{Crush Deformity} = 100\% * \left(1 - \frac{\frac{[H]_{above} + [H]_{below}}{2}}{[H]}\right)$$

$$\text{where}[H] = \frac{H_a + H_m + H_p}{3}$$

Normal = <20% deformity

Grade 1 = 20 < 25% deformity

Grade 2 = 25 < 40% deformity

Grade 3 = 40% + deformity

Based on these calculations, we designate vertebrae as containing wedge, biconcave, and/or crush deformities grades 1 through 3 or normal (if multiple deformities, only most severe deformity noted). We evaluate the accuracy of the networks in determining these classifications (in the testing dataset) for each imaging modality.

Figure 5:
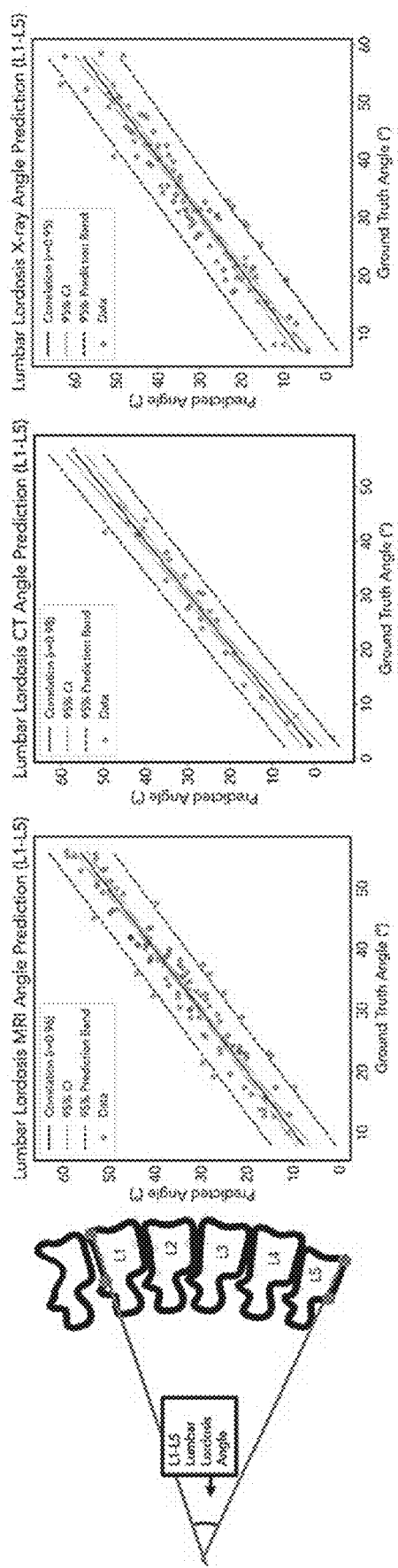
FIG. 5: Lumbar Lordosis Angle calculations. Left pane shows schematic of how L1-L5 lumbar lordosis angle (LLA) is calculated (with angle=LLA). Highlighted magenta landmarks are what is relevant for calculation, translucent landmarks are detected by the network, but not used in the calculation. Right three panels are graphs that show correlation between predicted LLA from the network predicted LLA to the ground truth LLA. Points correspond to individual measurements in test set for each modality.

Lumbar Lordosis Measurement:

As a measure of the additional clinical applicability of our network, we also evaluate how the network performs on angle measurement tasks for the spine such as lumbar lordosis angle (LLA) (see left panel of FIG. 5). These measurements can provide additional information regarding osteoporosis status and other bone diseases[11]. Using the detect L1 bottom corner landmarks and L5 top corner landmarks, we calculate LLA from the network and compare it to LLA calculated from ground-truth annotations. We then determine if there is correlation between predicted LLA and ground-truth LLA and if it is statistically significant (p<0.05, null hypothesis: no correlation).

Figure 6:
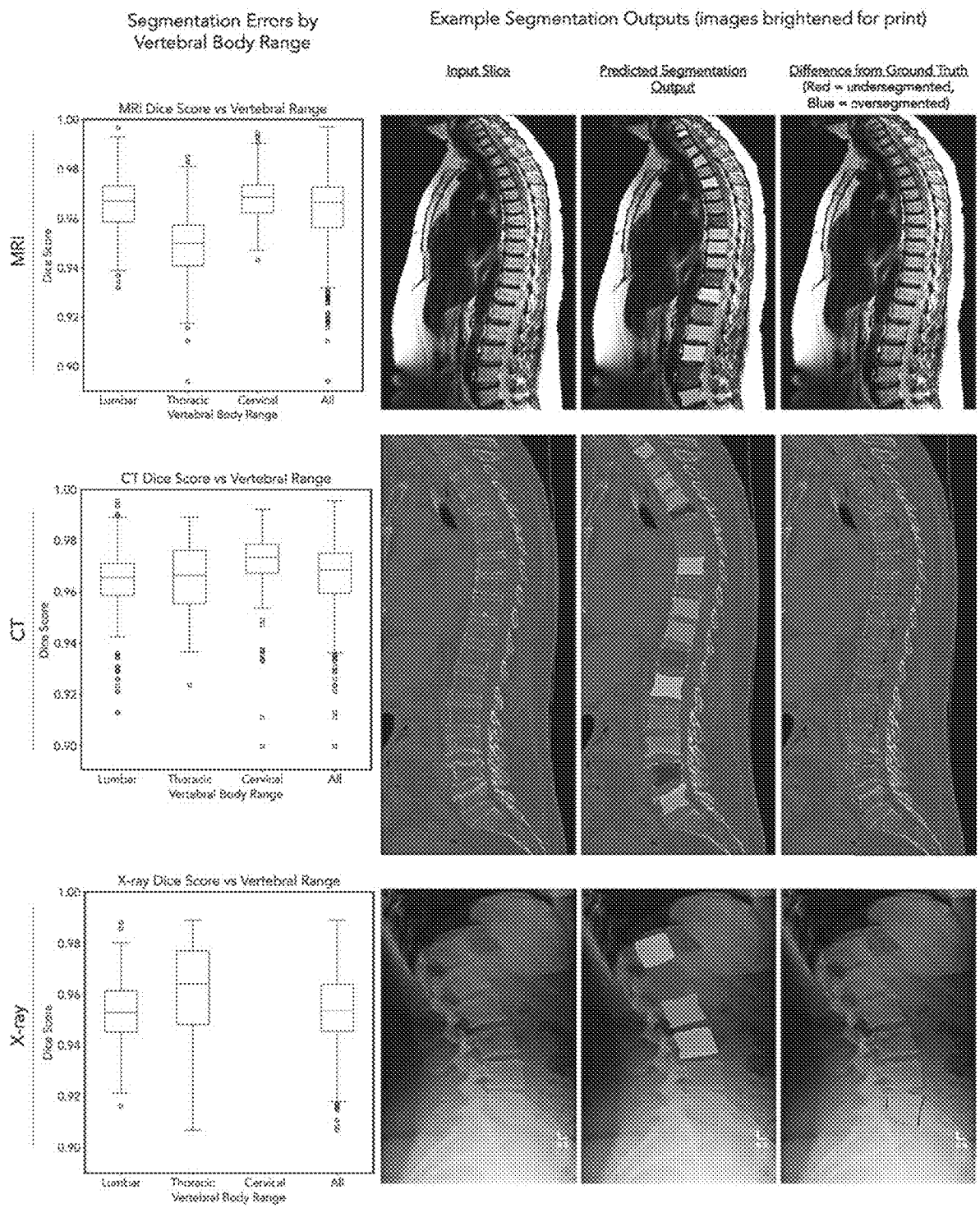
FIG. 6: Segmentation results. For each row, left pane corresponds to Dice score for that imaging modality across individual vertebral bodies (C1, C2 excluded because of absence from testing set). Box and whisker plots show median, 25th-75th percentile range and 1.5×IQR+outliers. Right three panels correspond to an input image, output of segmentations from the network evaluated on testing images (note the different colors that designate individual vertebral bodies as separate entities), and a difference map highlighting where segmentations differ from ground truth manually annotated for the input image.

Segmentation Performance:

Lastly, we evaluate the performance of the segmentation networks for each modality. Networks are evaluated using the Dice similarity coefficient (DSC) which is calculated per the following formula:

$$DSC = \frac{2|X \cap Y|}{|X| + |y|}$$

where X is the set of predicted mask pixel locations, and Y is the set of ground-truth annotated pixel locations. DSCs range from 0 to 1 where 1 indicates a segmentation that matches the ground truth segmentation for all pixel locations. We evaluate the DSC for each modality and each vertebral body in the testing dataset (ref FIG. 6). We also qualitatively assess the output segmentations for each network.

Results

Network Evaluation Time:

Evaluation time (measured as the amount of seconds it takes for the network to evaluate an image from the testing dataset for each imaging modality once loaded into memory) reached an average of 1.432±0.234 s (seconds, ±1SD) (MR: 1.311±0.145 s, CT: 1.394±0.189 s, X-ray: 1.492±0.121 s) for the landmark detection task and 1.656±0.117 s (MR: 1.566±0.098 s, CT: 1.697±0.141 s, X-ray: 1.683±0.119 s) for the segmentation task.

Vertebral Body Detection Accuracy

AUCs for each of the precision-recall curves for detected vertebral body bounding boxes produced by the networks range from 0.87 (in the case of the X-ray segmentation network) to 0.91 (for both the CT segmentation and landmark networks), outperforming a random object detector ("No skill") which, by definition, has an AUC of 0.50. The close range of agreement between the networks also indicates that they are similarly effective at detecting objects.

Figure 3:
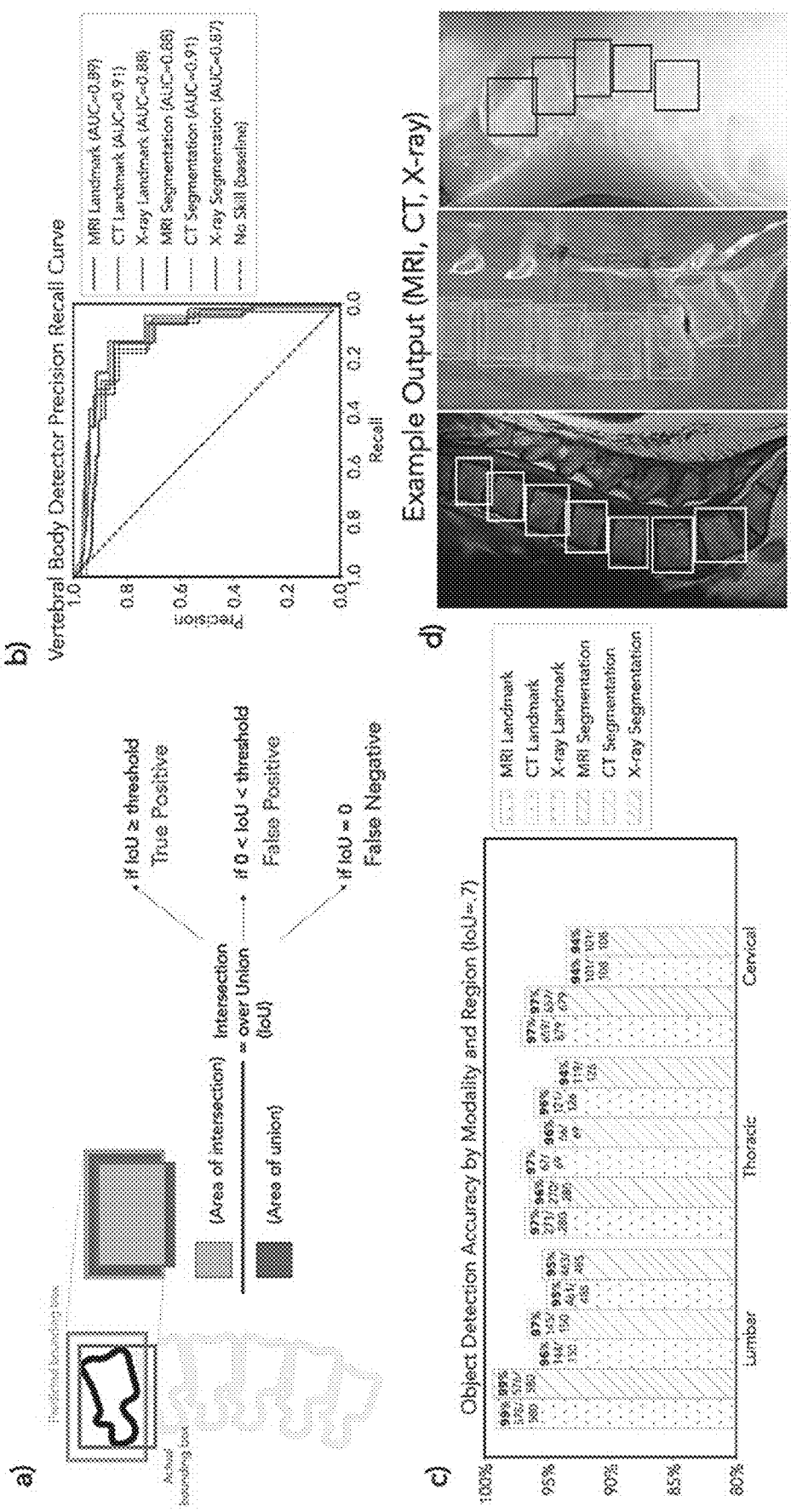
FIG. 3. Object Detection Metrics. The top left panel shows a graphic explaining the definition of IoU and what constitutes a true positive (TP), false positive (FP), and false negative (FN). These definitions are used to calculate a precision recall curve (top right) at several IoU thresholds (from 0 to 1 at 0.05 increments) for all networks. At IoU threshold 0.7 (picked for its ability to produce the highest amount of true positives while minimizing false positives), we also report (in bottom left panel) individual accuracy levels for detecting vertebrae across modalities in different regions of the spine (note absence of X-ray bars in Cervical regions because of no cervical region X-rays). Lastly, we show some example outputs from MRI, CT, and X-ray networks with vertebral bodies outlined.

To provide more meaningful measurements, accuracy of the object detector was evaluated at an IoU of 0.70 (accuracy=True Positive/# of vertebrae). Overall, each of the networks achieved greater than 95% accuracy at detecting vertebral bodies (Ref Table 2). Accuracy varied across the three regions of the spine (as shown in FIG. 3c) for each of the networks, but exceeded 93% accuracy in each of the regions. Manual analysis was undertaken on the vertebrae that did not reach IoU threshold (i.e. were missed either due to a poor bounding box or not marked at all) and grouped into four categories. For the MRI landmark and segmentation networks, most vertebrae that were not true positives were detected but were below the IoU threshold (30/36 deformities for landmark network, 29/36 deformities for Segmentation network). For the CT networks, the majority of deformities came from imaging artifacts (8/15 in Landmark network, 7/15 in Segmentation network), the most common of which were metal artifacts that obstructed several vertebrae from view. For the X-ray network, most deformities came from obstructive devices such as implanted screws and leads attached to the patient still visible in the scan that occluded vertebral bodies (20/29 in Landmark network, 19/29 in Segmentation network).

Landmark and Deformity Detection Accuracy

One of the primary capabilities of SpineTK is its ability to detect six landmarks on each vertebral body that correspond to the landmarks necessary to calculate heights for deformity diagnosis. For the MRI Landmark network, median X error is 4.0% (IQR 25th-75th percentile: 3.5-4.5%) and median Y error is 4.5% (IQR: 3.9-5.1%) over all regions of the spine. For the CT Landmark network, median X error is 4.1% (IQR: 3.4-4.8%) and median Y error is 4.6% (IQR: 3.8-5.4%) over all regions of the spine. Lastly, for the X-ray Landmark network, median X error is 3.4% (IQR: 3.0-3.8%) and median Y error is 3.7% (IQR: 3.3-4.1%) over all regions of the spine.

The MRI landmark network had an overall accuracy of 92.9% (1398/1505) for classifying deformities by the correct categories and an accuracy of 91.8% (1382/1505) when evaluating accuracy for calculating both deformity class and grade of deformity. For the CT landmark network, overall deformity class accuracy was 94.6% (295/312) and deformity & grade accuracy was 93.9% (293/312). For the X-ray landmark network, overall deformity class accuracy was 92.6% (539/582) and deformity & grade accuracy was 91.1% (530/582). For each modality, accuracy over individual grades within each deformity class increased with as the grade of the deformity increased, indicating that these networks perform well at detecting vertebrae that are at high risk of fracturing. Among misclassifications across all deformities (and across all modalities), wedge deformities are most often misclassified as biconcave deformities (3 out of 6 misclassifications), biconcave deformities are most often misclassified as normal (6 out of 14 misclassifications), crush deformities are most often misclassified as biconcave (12 out of 25 misclassifications), and normal vertebrae are most often misclassified as biconcave (45 out of 122 misclassifications).

Lumbar Lordosis Measurement

A linear correlation between the ground truth LLA and predicted LLA (from the network) was calculated to evaluate the accuracy of neural network predicted LLAs. The landmark networks achieved an r-value of 0.96 for MRI, 0.98 for CT, and 0.95 for X-ray (all p<0.00001, significant correlation). For the MRI landmark detection network, the mean absolute error (MAE; average of absolute differences between predicted angle and ground truth angle) was 2.64° (n=116) and for values outside of the normal Lumbar Lordosis (LL) range (20-45°), the MAE was 2.73°. For the CT landmark detection network the MAE was 2.24° (n=30) and the MAE for values outside the normal LL range was 2.37°. For the X-ray landmark detection network, MAE was 3.35° (n=97), and MAE for values outside the normal LL range was 3.49°.

Segmentation Performance

Outside of diagnoses and other clinical measurements that can be made from landmark data, information can be determined from segmentation of vertebral bodies in all modalities. For the MRI segmentation network, the average DSC was 0.966 (IQR: 0.956-0.972). For the CT segmentation network, the median DSC was 0.968 (IQR: 0.959-0.975). Lastly, for the X-ray segmentation network, the median DSC was 0.954 (IQR: 0.945-0.964). Qualitatively, we report that most segmentations tend to oversegment (include more pixels than ground-truth) and undersegment (exclude pixels from ground truth) mainly in areas isolated to the edges and corners of vertebral bodies, with the vast majority of inner regions of the vertebral body being segmented correctly.

DISCUSSION

We were able to create a neural network that can detect landmarks necessary for vertebral fracture diagnosis and perform segmentations on vertebral bodies across all regions of the spine. By training the network on hundreds of manually annotated cases for multiple imaging modalities, we were able to create a set of six neural networks, two (a landmark detection network and a segmentation network) for each imaging modality (MR, CT, X-ray) that all perform highly accurately in their respective domains. In our study, we evaluated the performance of the networks to detect vertebrae and found all of them were able to detect >95% of vertebral bodies in never-before-seen testing imaging studies. In the landmark detection networks, vertebral body landmark localization errors in the x and y direction were below 10% and corresponding deformity type and grading diagnosis accuracy was above 91%. Additionally, L1-L5 lumbar lordosis measurements yielded a high correlation coefficient (0.95 for all modalities) and a low mean absolute angle measurement error compared to the ground truth angle (<3.4°) for lumbar lordosis angles in the normal range (<3.5° in hypo/hyper-lordosis range). Lastly, we evaluated the performance of the segmentation networks and found that it was able to achieve median Dice coefficients>0.95, indicating a highly accurate segmentation. This is the first network design that has achieved the level of accuracy and breadth of output metrics we have (we also compare our findings to others in Table 3).

The potential impact that this network could have in clinical medicine is enormous given its ability to evaluate scans quickly (<2 s/slice) for deformities. For example, this network can easily be adapted to accept an entire imaging series (rather than just a single slice), select the slice that has the maximal number of vertebrae visible (i.e. max detected vertebral bodies), and prioritize reports for further review based on the number of detected deformities. Furthermore, vertebral heights (output from the network) can be monitored for changes in patients diagnosed with degenerative bone diseases, such as osteoporosis, potentially preventing major fracture events from occurring by aiding in treatment/surgical planning. The segmentation networks can be put to immediate use for research efforts which analyze bone texture and strength, or retrospective studies that seek to evaluate changes in bone structure over time in large datasets containing thousands of patients. Lastly, given that our network could be trained in less than 30 minutes on publicly available compute power, we are confident that this network design can be extended upon and work to report measurements for other imaging modalities. Additionally, we show that the amount of annotated samples required to train this network measure in the hundreds (since our CT and X-ray networks with 110 and 387 training cases, respectively, achieved comparable performance to the MRI network trained on many more cases), meaning individuals can generate enough data to train this network in the matter of days.

Limitations of the network primarily arise from the training data itself. In the object detection task, we reported that missed objects came from fused vertebrae, imaging artifacts (such as metal artifacts in CT images or low contrast in X-ray images), or obstructive devices (such as screws and leads). Cases that were affected by those issues were very rare and thus under-represented in our training dataset. A future study can rectify this issue by training the network on a dataset that contains more artifacts or by specifically augmenting scans with artifacts in them. We also showed that, while our network could classify vertebrae according to the correct deformity and grade, low grade deformities achieved a lower accuracy compared to high grade deformities. This issue is to be expected since the low grade deformities have stringent cutoffs (5% deformity range for grade 1) and those deformities are relatively under-represented in the underlying dataset (compared to normal vertebrae). Lastly, in the segmentation networks, we qualitatively show that edges and corners tend to be erroneously segmented. This could be due to either an inherent network design issue, or (perhaps a more likely cause), slight inconsistencies in manual segmentation around edges of vertebral bodies in low resolution or unclear scans.

We conclude that SpineTK detects vertebral bodies, locates landmarks on vertebral bodies, and accordingly determines vertebral diagnoses, measure other clinically useful metrics such as lumbar lordosis angle, and performs segmentations on individual vertebral bodies. Furthermore, it is able to do these tasks rapidly and with high accuracy across MR, CT, and X-ray images. Future directions for this study include adapting the network to perform 3D segmentations to automatically produce even more clinically useful measurements and examining its efficacy in a clinical care setting.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

REFERENCES

The disclosure of each of the following references is incorporated herein by reference in its entirety.

1. Office of the Surgeon General (US). *Bone Health and Osteoporosis: A Report of the Surgeon General*. (Office of the Surgeon General (US), 2004).
2. Wong, C. C. & McGirt, M. J. Vertebral compression fractures: a review of current management and multimodal therapy. *J. Multidiscip. Healthc.* 6, 205-214 (2013).
3. Weaver, J., Sajjan, S., Lewiecki, E. M., Harris, S. T. & Marvos, P. Prevalence and Cost of Subsequent Fractures Among U.S. Patients with an Incident Fracture. *J. Manag. Care Spec. Pharm.* 23, 461-471 (2017).
4. Silverman, S. L. et al. The relationship of health-related quality of life to prevalent and incident vertebral fractures in postmenopausal women with osteoporosis: results from the Multiple Outcomes of Raloxifene Evaluation Study. *Arthritis Rheum.* 44, 2611-2619 (2001).
5. Salaffi, F. et al. The burden of prevalent fractures on health-related quality of life in postmenopausal women with osteoporosis: the IMOF study. *J. Rheumatol.* 34, 1551-1560 (2007).
6. Lenchik, L., Rogers, L. F., Delmas, P. D. & Genant, H. K. Diagnosis of osteoporotic vertebral fractures: importance of recognition and description by radiologists. *AJR Am. J. Roentgenol.* 183, 949-958 (2004).
7. Rajapakse, C. S. et al. Vertebral deformities and fractures are associated with MRI and pQCT measures obtained at the distal tibia and radius of postmenopausal women. *Osteoporos. Int. J. Establ. Result Coop. Eur. Found. Osteoporos. Natl. Osteoporos. Found. USA* 25, 973-982 (2014).
8. Genant, H. K., Wu, C. Y., van Kuijk, C. & Nevitt, M. C. Vertebral fracture assessment using a semiquantitative technique. *J. Bone Miner. Res.* 8, 1137-1148 (2009).
9. Bartalena, T. et al. Prevalence of thoracolumbar vertebral fractures on multidetector CT. *Eur. J. Radiol.* 69, 555-559 (2009).
10. Sekuboyina, A. et al. VerSe: A Vertebrae Labelling and Segmentation Benchmark. *ArXiv200109193 Cs Eess* (2020).
11. Cunha-Henriques, S. et al. Postmenopausal women with osteoporosis and musculoskeletal status: a comparative cross-sectional study. *J. Clin. Med. Res.* 3, 168-176 (2011).

Tables

TABLE 1

Overview of data used to train and test the neural network. 80% of cases are reserved to train the network to detect vertebral bodies and produce landmark annotations and segmentation. 20% of cases are reserved for testing and are never used to train the network (i.e. the network has not "seen" them before). Additional information is provided about the number of vertebrae in the training and testing sets that are located in the lumbar, thoracic, and cervical regions of the spine (note there were no X-rays containing cervical vertebrae in the dataset we have).

| Modality | Total # of Cases (Train/Test/Total) | Ave Age ± SD (Train/Test/Overall) | Lumbar Vertebrae (Train/Test/Total) | Thoracic Vertebrae (Train/Test/Total) | Cervical Vertebrae (Train/Test/Total) |
|---|---|---|---|---|---|
| MRI (T1&T2) | 898/225/1123 | 67 ± 11/66 ± 12/68 ± 11 | 2315/580/2895 | 1116/280/1398 | 2723/679/3402 |
| CT | 110/27/137 | 64 ± 5/67 ± 4/65 ± 5 | 599/150/749 | 308/69/377 | 434/108/542 |
| X-ray | 387/97/484 | 57 ± 17/58 ± 16/57 ± 17 | 1911/485/2396 | 473/126/599 | N/A |

TABLE 2

Common misses. This table outlines the common reasons for why vertebrae were missed from the object detector. Main categories are outlined in the 2nd through 4th column.

| Network Modality (Type) | Vertebra detected but below IoU threshold | Obstructive devices (e.g. screws, wires) | Fused vertebrae | Imaging artifacts | Total Accuracy |
|---|---|---|---|---|---|
| MRI (Landmark) | 30 | 0 | 4 | 0 | 1505/1539 = 97.8% |
| CT (Landmark) | 0 | 2 | 5 | 8 | 312/327 = 95.4% |
| X-ray (Landmark) | 8 | 20 | 0 | 1 | 582/611 = 95.2% |
| MRI (Segmentation) | 29 | 1 | 4 | 2 | 1503/1539 = 97.7% |
| CT (Segmentation) | 2 | 2 | 4 | 7 | 312/327 = 95.4% |
| X-ray (Segmentation) | 10 | 19 | 0 | 0 | 582/611 = 95.2% |

TABLE 3

Comparisons to other papers. Here we show the individual papers, what modalities their algorithms seed to segment or do measurements on, their primary result, how our result compares to theirs, and a verdict stating whether we match their results or improve upon them. We note that no other paper has shown the ability to calculate vertebral heights and output deformity diagnoses.

| PAPER | MODALITY | RESULTS FROM LITERATURE | OUR RESULT |
|---|---|---|---|
| EBRAHIMI ET AL. (2016)[9] | X-ray | Lumbar vertebrae corner localization accuracy b/w 0.6-1.4 mm | Separate calculators yield average corner localization accuracy of 0.73 mm, for X-ray Lumbar Region |
| MASAD ET AL (2019)[2010] | MR | Lumbar lordosis prediction using image processing + decision tree classifier yield R = .93 | R = 0.96 |
| VANIA ET AL (2019)[11] | CT | Dice coefficient 0.94 (3D-Axial) | Dice coefficient 0.968 (2D-Sagittal) |
| LU ET AL (2018)[12] | MR | Dice coefficient 0.93 | Dice coefficient 0.966 |
| KIM ET AL (2020)[13] | CT | Dice coefficient 0.904 (3D-Axial) | Dice coefficient 0.968 (2D-Sagittal) |
| CHO ET AL (2019)[14] | X-ray | Dice coefficient = 0.841, LL MAE = 8.055° (top endplate L1-top endplate S1) | Dice = 0.954, LL MAE 3.35° (top endplate L1-bottom endplate L5) |
| CHEN ET AL (2015)[15] | CT + MR | MR Dice Coefficient 0.887 CT Dice Coefficient 0.910 | MR Dice coefficient 0.966, CT Dice coefficient 0.968 |

What is claimed is:

1. A method for automatic assessment of spine health, the method comprising:
   receiving a medical image of at least a portion of a spine in a patient;
   supplying the medical image to a deep learning network trained using a plurality of training spine images and, for each training spine image, one or more spine measurement annotations, wherein supplying the medical image to the deep learning network includes supplying the medical image to a feature generation network that performs convolutions and produces, as outputs, learnable features;
   providing the outputs from the feature generation network to a region recognition network that produces, as output, an objectness logits map showing a probability of an approximate region containing an object;
   combining the features and the objectness logits map to produce a combined output from the region recognition network and providing the combined output to a landmark network;
   detecting, using the landmark network, five or more vertebral landmarks for each of a plurality of vertebral bodies depicted in the medical image; and
   outputting, for at least a first vertebral body, one or more deformity measurements based on the vertebral landmarks for the first vertebral body.

2. The method of claim 1, comprising determining an anterior height, middle height, and posterior height of each vertebral body using the vertebral landmarks for the vertebral body.

3. The method of claim 2, comprising performing a deformity analysis of each vertebral body using the anterior height, middle height, and posterior height of the vertebral body.

4. The method of claim 1, comprising determining a measure of lumbar lordosis using the vertebral landmarks of the vertebral bodies.

5. The method of claim 1, comprising producing individual segmentations for each vertebral body.

6. The method of claim 5, comprising generating, by the region recognition network, a final bounding box for each vertebral body, outputting the final bounding box to a segmentation network, and wherein producing the individual segmentations comprises generating, by the segmentation network, a segmentation mask within each final bounding box.

7. The method of claim 1, wherein the medical image is one of: a magnetic resonance imaging (MRI) image, a computed tomography (CT) image, and an X-ray image.

8. A system for non-invasively predicting patient-specific bone resilience or toughness, the system comprising:
at least one processor; and
a spine health assessor implemented on the at least one processor and configured to perform operations comprising:
receiving a medical image of at least a portion of a spine in a patient;
supplying the medical image to a deep learning network trained using a plurality of training spine images and, for each training spine image, one or more spine measurement annotations, wherein supplying the medical image to the deep learning network includes supplying the medical image to a feature generation network that performs convolutions and produces, as outputs, learnable features;
providing the outputs from the feature generation network to a region recognition network that produces, as output, an objectness logits map showing a probability of an approximate region containing an object;
combining the features and the objectness logits map to produce a combined output from the region recognition network and providing the combined output to a landmark network;
detecting, using the landmark network, five or more vertebral landmarks for each of a plurality of vertebral bodies depicted in the medical image; and
outputting, for at least a first vertebral body, one or more deformity measurements based on the vertebral landmarks for the first vertebral body.

9. The system of claim 8, the operations comprising determining an anterior height, middle height, and posterior height of each vertebral body using the vertebral landmarks for the vertebral body.

10. The system of claim 9, the operations comprising performing a deformity analysis of each vertebral body using the anterior height, middle height, and posterior height of the vertebral body.

11. The system of claim 8, the operations comprising determining a measure of lumbar lordosis using the vertebral landmarks of the vertebral bodies.

12. The system of claim 8, the operations comprising producing individual segmentations for each vertebral body.

13. The system of claim 12, the operations comprising generating, by the region recognition network, a final bounding box for each vertebral body, outputting the final bounding box to a segmentation network, and wherein producing the individual segmentations comprises generating, by the segmentation network, and a segmentation mask within each final bounding box.

14. The system of claim 8, wherein the medical image is one of: a magnetic resonance imaging (MRI) image, a computed tomography (CT) image, and an X-ray image.

15. A non-transitory computer readable medium storing executable instructions that when executed by at least one processor of a computer control the computer to perform operations comprising:
receiving a medical image of at least a portion of a spine in a patient;
supplying the medical image to a deep learning network trained using a plurality of training spine images and, for each training spine image, one or more spine measurement annotations, wherein supplying the medical image to the deep learning network includes supplying the medical image to a feature generation network that performs convolutions and produces, as outputs, learnable features;
providing the outputs from the feature generation network to a region recognition network that produces, as output, an objectness logits map showing a probability of an approximate region containing an object;
combining the features and the objectness logits map to produce a combined output from the region recognition network and providing the combined output to a landmark network;
detecting, using the landmark network, five or more vertebral landmarks for each of a plurality of vertebral bodies depicted in the medical image; and
outputting, for at least a first vertebral body, one or more deformity measurements based on the vertebral landmarks for the first vertebral body.

16. A method for automatic assessment of spine health, the method comprising:
receiving at least one medical image of at least a portion of a spine in a patient;
supplying the at least one medical image to a deep learning network trained
using a plurality of training spine images and, for each training spine image,
one or more spine measurement annotations, wherein supplying the medical image to the deep learning network includes supplying the medical image to a feature generation network that performs convolutions and produces, as outputs, learnable features;
providing the outputs from the feature generation network to a region recognition network that produces, as output, an objectness logits map showing a probability of an approximate region containing an object;
combining the features and the objectness logits map to produce a combined output from the region recognition network and providing the combined output to a landmark network;
producing, using the landmark network, individual segmentation for each of a plurality of vertebral bodies or intervertebral disks depicted in the at least one medical image; and outputting, for at least one vertebral body or intervertebral disk, one or more anatomical measurements based on the vertebral landmarks for the at least one vertebral body.

\* \* \* \* \*